3,530,201
Patented Sept. 22, 1970

1

3,530,201
DYEABLE POLYOLEFINS CONTAINING THERMOPLASTIC NITROGEN CONTAINING POLYMERS AND POLYETHYLENE OXIDE
Andor Schwarcz, Pompton Lakes, N.J., assignor to Uniroyal, Inc., New York, N.Y., a corporation of New Jersey
No Drawing. Continuation-in-part of application Ser. No. 599,362, Dec. 6, 1966. This application Nov. 1, 1967, Ser. No. 679,618
Int. Cl. C08g *41/04;* C08f *41/12, 29/12*
U.S. Cl. 260—857
17 Claims

ABSTRACT OF THE DISCLOSURE

The invention relates to a composition of matter which can be spun into fibers, which are dyeable with anionic dyes, said composition comprising at least 80 to 99% by weight of a fiber forming, alpha-monoolefinic polymer, between about 0.5 and 5% by weight of a polymeric thermoplastic basic nitrogen-containing dye receptor and between about 0.5 and 5% by weight of polymers containing ethylene oxide.

---

The present invention is directed to the production of dye-receptive melt extruded fibers or shaped articles, capable of being formed into fibers, from fiber-forming alpha-monoolefinic hydrocarbon polymers. More particularly, it is directed to a composition of matter including, as its major constituent, polypropylene, polyethylene or the like, which composition of matter may be melt extruded to form fibers or articles such as films and tapes capable of being formed into fibers which are readily dyed by anionic dyes.

The composition of matter will be described herein mainly in terms of fibers (both staple and continuous filament), but it is to be understood that other forms also may be produced such as monofilaments, multifilaments, films, and tapes which can subsequently be processed into fibers.

Poly-alpha-olefins are well-known for being inherently undyeable due both to lack of polar sites in their molecular structures to which dye molecules may become attached, and to difficulty of penetration of dye molecules into their molecular structures. Processes for overcoming these defects have long been sought, because good dyeability is a prerequisite for many commercial applications to which these polymers would be outstandingly suited. For example, blends of polyolefins with minor amounts of anionic, cationic or nonionic modifiers have been used but the shaped articles made therefrom are dyeable to light shades only and the dark shades necessary for a commercially saleable product are difficult to obtain. The prior art suggests the use of combinations of the above noted types of modifiers to impart dyeability to polyolefins. However these disclosures are of such a vague and general nature that they provide no guide whatsoever for the actual preparation of commercially acceptable dyeable fibers.

Other techniques for making polyolefins dyeable have involved the use of relatively large, that is, greater than five to ten percent by weight, amounts of additive dye receptors. These techniques are impractical because of the incompatibility of such amounts of dye receptor additives with polyolefins, which results in poor fiber properties, and because of the great added expense of the dye receptor.

A process for rendering polyolefins dyeable with acid type (anionic) dyes is described in U.S. Pat. 3,361,843, to Robert Miller et al. The process involves incorporating lesser amounts, generally between 0.5% and 10%, of a highly basic polymer, for instance a polyvinylpyridine, into the inherently undyeable polymer before the polymeric mixture is shaped into fibers. After being shaped, the fibers are made permeable to anionic, water-soluble dyes by acid after-treatment. The latter step is termed "activation."

It is an object of this invention to provide polymeric fibers which are dyeable with anionic dyes to deep shades with good fastness properties. It is a further object of this invention to provide polyolefinic fibers which may be dyed with anionic dyes without activation. It is another object to provide a process for making polyolefinic fibers which are readily dyeable in an economical fashion and without degrading other properties of the resultant product. It is a still further object of this invention to provide a method of dyeing polyolefinic fibers with improved economy. Other objects and advantages of this invention will be apparent to those skilled in the art from a study of this specification.

It has been found that compositions of matter containing a major portion of fiber-forming alpha-monoolefinic polymers, such as polypropylene, polyethylene, poly(4-methyl-1-pentene), or etc., may be made dyeable with anionic dyes without further processing steps, thereby eliminating the need for activation after-treatment. This property of good dyeability in the present invention without activation is termed "self-activation," since it is believed that similar chemical mechanisms are operating.

The compositions of matter which have been found to be self-activating are comprised of (A) less than 97% by weight of fiber-forming alpha-mono-olefin polymer; (B) between about 0.5 and 5% by weight of a polymeric basic nitrogen-containing dye receptor; and (C) between about 0.5 and 5% by weight of a hydrophilic compound which is a homopolymer or derivative thereof, or copolymer containing ethylene oxide units ($-CH_2-CH_2-O-$) in prescribed amounts. The total amount of the B plus C components in said composition is greater than 3%. The percentages listed above for each component present in the fiber is given in percent by weight of the total composition.

The inherently undyeable alpha-olefin polymers comprise both homopolymers and copolymers of alpha-olefins, for example, copolymers with non-terminal olefins or with one or more other alpha-olefins, as well as block copolymers of alpha-olefins with each other and graft copolymers of alpha-olefins with polymers of other alpha-olefins. The class includes polyethylene, polypropylene, poly(3-methyl-1-butene), poly(4-methyl-1-butene), copolymers of propylene and 3-methyl-1-butene, copolymers of propylene and 4-methyl-1-pentene, and copolymers of any of the foregoing monomers with each other and/or with other copolymerizable monomers. The preferred material is polypropylene, by which we mean any polymer or copolymer containing predominantly polymerized propylene together with any other comonomer copolymerized therewith.

The dye receptor compounds, (B), are basic nitrogen-containing polymers suitable for admixing with the inherently undyeable polymers for the purposes of this invention and which will bind anionic and other types of dyes. The polymers used can be made by any polymerization process, including condensation, addition and combination, but should have a basic ionization constant (dissociation constant) greater than $1 \times 10^{-14}$. Another factor of equal importance to the actual dissociation constant is the affinity of the basic polymers for dyestuffs, i.e., an ability to form some type of bond, either specific or nonspecific, with the dyes.

It is understood that the basic nitrogen polymers blended with the alpha-olefin polymers in accordance with the present invention should not be excessively leachable from the shaped object during the dyeing process. Thus, dye receptors, such as polyethyleneimine and low molecular weight fatty amines are leachable to an undesirable extent and would migrate from the shaped object into the dyebath and be of no use in binding the dye in the fiber. The presence of leached dye receptor in the dyebath is highly undesirable since in many cases it forms complexes with the dye, thus making the dye unavailable for dyeing the fiber. In addition, these complexes are frequently insoluble in the dyebath and cause unsightly blotches on the shaped object. Suitable dye receptor compounds, (B), are exemplified by:

(1) Thermoplastic homopolymers of vinyl-substituted monocyclic and polycyclic pyridine compounds, including quinolines, and their copolymers with each other. Among the vinylpyridine compounds useful for this purpose in this invention are 2-vinylpyridine, 3-vinylpyridine, 4-vinylpyridine and alkyl substituted vinylpyridine compounds such as 3-methyl-6-vinylpyridine, 2-ethyl-5-vinylpyridine, 2-methyl-5-vinylpyridine, 2-ethyl-6-vinylpyridine, 2-isopropenylpyridine, etc. Preferred materials of this class for use in this invention are polymers of at least one vinylpyridine compound, by which is meant homopolymers of vinylpyridine compounds such as poly(2-vinylpyridine), poly(4-vinylpyridine), poly(2-methyl-5-vinylpyridine), poly(2-isopropenylpyridine), etc., copolymers of various vinyl-substituted pyridine compounds with each other, such as copolymers of 2-vinylpyridine and 2-methyl-5-vinylpyridine in any desired proportions, copolymers of 2-vinylpyridine with 2-isopropenylpyridine in any desired proportions, copolymers of 4-vinylpyridine with 2-vinylquinoline in any desired proportions as well as copolymers of three, four, or more of these polymerizable materials. Compounds such as the foregoing have a basic ionization constant of about $1 \times 10^{-9}$, and will bind anionic and disperse dyes. Copolymers of these vinyl-substituted monocyclic and polycyclic pyridine compounds with non-polar monomers such as styrene, substituted styrenes, vinylnaphthalene and the like are not effective in the present invention.

(2) Thermoplastic intralinear polyamides, including condensation polymers of a bifunctional amine with a bifunctional carboxylic acid or the anhydride thereof, such as poly-(hexamethylene adipamide) (nylon 66), poly(hexamethylene sebacamide) (nylon 610), as well as linear polyamides formed from cyclic compounds, such as polypyrrolidinone, polycaprolactam (nylon 6), polyenantholactam, and copolyamides, such as interpolymers of hexamethylene adipamide and hexamethylene sebacamide with caprolactam sold under the trademark Zytel 61, 63 and 69. Compounds such as the foregoing have a basic ionization constant of about $1 \times 10^{-14}$, and will likewise bind anionic and disperse dyes. Polyvinylpyrrolidone (a polymer having pendant cyclic amide groups), polyacrylamide and similar materials are not effective in this invention because they are infusible, excessively leachable and incompatible with the polyolefin matrix.

(3) Thermoplastic polymeric amine compounds, including condensation polymers in which the amine group is an integral part of the polymer chain, as well as addition homopolymers and copolymers wherein pendant groups include or consist of amine groups. Examples of polymeric amine compounds useful in this invention are the reaction product of styrene-maleic anhydride copolymer with 3-(dimethylamino)-propylamine, the product being an aminoamide (such a material has been described by Cohen & Minsk, J. Org. Chem. 24, 1404, 1959); and the reaction product of N-methyl-bisaminopropylamine with 2,4-tolylene diisocyanate, the product being a poly(aminourea). Compounds such as the foregoing have a basic ionization constant of about $1 \times 10^{-4}$, and will bind anionic and other types of dyes.

Although the invention is applicable in the range of 0.5 to 5% content of nitrogen base polymer in the fiber, it is preferred to employ the range of 1 to 4%, the particular value depending upon factors such as the nitrogen content and relative basicity of the nitrogen base polymer, as well as the type and amount of hydrophilic compound utilized. Such a narrower range is advantageous because of the high cost of nitrogen base polymer and because it minimizes any undesirable effects on the physical properties and whiteness of the fiber. The presence of 0.5 to 5% of basic nitrogen polymer in the fiber is usually sufficient to exhaust a 1% (OWF) (on the weight of the fiber) dye bath, which gives deep colors with many dyes. It has been found that, in some cases in the practice of this invention, it is possible to obtain excellent dyeability with as little as 0.025% of basic nitrogen (based on total weight) in the polymeric fiber although up to 1.5% nitrogen may be used.

A feature of the present invention is the discovery of certain compounds which act as the (C) ingredient.

The third (C) component of the present composition is a hydrophilic compound which is a homopolymer or derivative thereof, or copolymer, all of which specifically contain ethylene oxide units $\{CH_2-CH_2-O\}$. It has been determined experimentally that other poly (alkylene oxides) (e.g., polymethylene oxide, polypropylene oxide, polybutylene oxide) are not satisfactory for use in the invention because such polyalkylene oxides are ineffective in producing the commercially acceptable dyeability with anionic dyes which characterizes the present invention. It has been determined by visual observation and quantitative color intensity measurements that a commercially acceptable dyed fiber can be obtained if the (C) component of the composition is either (1) Polyethylene glycol (also referred to herein as PEG) having a degree of polymerization (DP) of at least 4; or (2) Copolymers having a degree of polymerization of the ethylene oxide units of at least 4 and containing a minimum of 60% by weight ethylene oxide, for example the series of block or irregular copolymers produced by condensing ethylene oxide with a product formed by the condensation of propylene oxide with propylene glycol (formula of such copolymers:

and sold under the trademark "Pluronic." Other useful copolymers are derived from the polymerization of ethylene oxide and propylene oxide.

(3) Derivatives of polyethylene glycol such as ethers and esters of same having a degree of polymerization of ethylene oxide of at least 4 and an ethylene oxide content of at least 60% by weight. Examples of such derivatives are: (a) polyethylene glycol alkyl ethers; (b) alkylaryl polyethoxyalcohols sold under the trademark "Triton" (the octyl (or isoctyl) phenyl polyethoxy ethanol series); (c) polyoxyethylene derivatives of long chain fatty acid partial esters of hexitol anhydrides including sorbitans, sorbides, mannitans and mannides, such as polyethylene glycol hexitol carboxylates preferably polyoxyethylene sorbitan monolaurate sold under the trademark "Tween 20" and polyoxyethylene sorbitan monostearate; and (d) polyethylene glycol carboxylate esters such as polyethylene glycol monostearate and polyethylene glycol distearate.

In order to obtain a product which is dyeable with anionic dyes to acceptable commercial standards, the molecular weight of the homopolymers of polyethylene glycol should be at least 194. Obviously, there are some preferred molecular weight ranges in which a better degree of dyeability is obtained than at the remaining ranges. The preferred molecular weight ranges of the C component are from about 300 to 1500 and from about 100,000 to 7,000,000 within the composition limits specified herein. The polyethylene glycols having initial molecular weights in the range from 100,000 to 7,000,00 are suitable for use with any of the basic nitrogen dye receptors mentioned above within the complete range of specified composition limits listed for the B and C components. Polyethylene glycols having molecular weights between about 300 and 1500, although also operative within the composition limits listed for components B and C, provide optimum dyeability results when the amount of the basic nitrogen-dye receptors (B) in the composition is about 2 or more parts by weight per hundred parts of polypropylene resin ("phr."). The upper molecular weight limit for derivatives and copolymers is not critical and can generally be in the same range as the homopolymer depending upon the specific properties of the derivative or copolymer involved.

In order for a fiber to possess dyeability of commercial quality, it must be dyeable to deep shades. The mere improvement in dyeability from no dyeability to the ability to attain light shades is wholly insufficient to constitute commercially acceptable dyeability. The present invention produces dyeability to dark shades as well as light shades, using conventional dyes and dyeing techniques.

The fiber may be scoured if desired, and dyed by immersion in a dye bath. It is a feature of the present composition of matter that it may be dyed by many types of dyes. Dyes particularly suitable for use with this invention are the acid dyes, i.e., those in which the color bodies are anionic. This includes a number of categories of dyes, one of which is the strong acid dyes, typified by the following:

Acid Blue 80 (C.I. No. 61585)
Acid Yellow 23 (C.I. No. 19140)
Acid Orange 7 (C.I. No. 15510)
Acid Red 73 (C.I. No. 27290)
Acid Blue 45 (C.I. No. 63010)
Acid Blue 78 (C.I. No. 62105)
Acid Blue 62 (C.I. No. 62045)

Another category of anionic dyes is the acid metallized dyes, typified by:

Acid Yellow 54 (C.I. No. 19010)
Acid Orange 72 (C.I. No. 18740)
Acid Red 186 (C.I. No. 18810)
Acid Blue 158 (C.I. No. 14880)
Acid Red 212

Still another category of anionic dyes is the neutral metallized dyes typified by the following:
Acid Yellow 121 (C.I. No. 18690)
Acid Orange 60 (The half-chrome complex of 1-phenyl-3-methyl - 4 - (2-hydroxy-5-sulfamoyl phenylazo)-5-pyrazolone)
Acid Red 209
Acid Blue 168

Still another category of anionic dyes is the direct dyes, typified by the following:

Direct Yellow 44 (C.I. No. 29000)
Direct Red 13 (C.I. No. 22155)
Direct Blue 67 (C.I. No. 27925)

Other categories of anionic dyes which are applicable to our invention are the reactive dyes, typified by Reactive Orange 1, and the mordant acid dyes, typified by Mordant Red 5 (C.I. No. 58005).

The products are also highly dyeable with disperse dyes, typified by Disperse Yellow 23 (C.I. No. 26070), Disperse Blue (C.I. No. 64500) and Disperse Red 13 (C.I. No. 11115); and vat dyes, typified by Vat Green 1 (C.I. No. 59825/6) and Vat Red 1 (C.I. No. 73360/1), but dyeability with these dyes is not a feature of this invention.

In order to disclose more clearly the nature of the present invention, specific examples of the practice of the invention are hereinafter given. It should be understood, however, that this is done solely by way of example and is intended neither to delineate the scope of the invention nor limit the ambit of the appended claims.

The polyethylene glycols used in the examples were commercially available materials sold under various marks, such as Polyox and Carbowax (Union Carbide Chemical Corp.).

The term "phr." means "parts per hundred of the resin."

In order to illustrate more concretely the great improvement in dyeability brought about by the combination of basic nitrogen-containing polymer dye receptor and ethylene oxide-containing polymer, the color intensities of some sample have been instrumentally measured in comparison with controls containing no ethylene oxide.

For this purpose, certain samples of dyed fiber were ground in a Wiley mill to pass a No. 40 screen, compressed at 78 p.s.i., and their reflectance measured in a Model D–1 Color-Eye Colorimeter (manufactured by Industrial Development Laboratories, Inc., Attleboro, Mass.). The measurement was made with a "Y" tristimulus filter and the reflectances corrected to C.I.E. values.

Since reflectance decreases as color intensity increases, the corrected readings were converted by means of their reciprocals to an "I" value which is directly proportional to color intensity, by the following formula:

$$\text{``I''} = \frac{1}{\text{C.I.E. reflectance (Y)}} \times 1{,}000$$

These values are listed in the examples. C.I.E. is an abbreviation of Commission Internationale D'Eclairage (The International Committee on Illumination.)

Other samples were rated for color intensity by dissolving the dyed fiber in 70/30 mixture of Decalin and isopentyl alcohol and determining the optical density colorimetrically.

EXAMPLE 1

A blend of 3 parts of poly(2-vinylpyridine) with 2 parts of polyethylene glycol of molecular weight 4 million was milled at 340° F. with 100 parts of isotactic polypropylene of melt index 5–6. The poly(2-vinylpyridine) was prepared by a suspension polymerization process using azo-bis-isobutyronitrile as initiator. Samples of the poly(2-vinylpyridine) prepared in this manner had intrinsic viscosities, measured in pyridine at 30° C., ranging from 0.8 to 1.0.

The milled mixture was cooled, ground and dried. It was then extruded at 550° F. into an 8-filament yarn using a conventional melt-spinning apparatus. The resultant yarn was drawn 4:1 at 275° F. to yield a drawn yarn of 15.5 denier/filament. Its tenacity was 3.7 g./den. (grams per denier) and its elongation at the break 28%.

Skeins of the drawn yarn were dyed by a conventional procedure as described below; they were prescoured for 20 minutes with a small amount of nonionic surfactant such as Triton X–100 (which is a condensate of octylphenol with 9–10 moles of ethylene oxide) at a pH of 9 to 10 at 200° F. using a bath to fiber ratio of about 100 to 1. They were then dyed with 3% OWF dye at 200–210° F. for one hour in a dye bath acidified with 9% OWF of either acetic acid or formic acid and containing a small amount of non-ionic detergent, using a bath to fiber ratio of 90 to 1. After dyeing, the skeins were post-scoured for 10 minutes at 160° F. in a bath containing a small amount of non-ionic surfactant, at a bath to fiber ratio of about 100 to 1.

Using the dyeing procedure described above, deep colors were obtained with 3% OWF concentrations of the following dyes:

Acid Orange 60 (the half chrome complex of 1-phenyl-3-methyl - 4 - (2-hydroxy-5-sulfamoyl phenylazo)-5-pyrazolone)
Acid Yellow 121 (C.I. No. 18690)
Acid Blue 158 (C.I .No. 14880)
Acid Blue 45 (C.I. No. 63010)
Disperse Yellow 23 (C.I. No. 26070)
Direct Blue 67 (C.I. No. 27925)
Vat Green 1 (C.I. No. 59825)

Similar yarns, spun from blends containing no polyethylene glycol yielded pale or light dyeings when dyed with the same dyes.

EXAMPLE 2

Blends of 3 parts of poly(2-vinylpyridine) with 2 parts of polyethylene glycol of various molecular weights were milled with 100 parts of isotactic polypropylene at 340° F. They were then melt-extruded into fiber by the same procedure as in Example 1. The tenacities of the drawn yarns ranged from 3.1 to 4.6 g./den. and the breaking elongations from 23 to 50%.

Skeins of the drawn yarns were pre-scoured for 20 minutes with a small amount of nonionic surfactant at a pH between 9 and 10 at 200° F. using a bath to fiber ratio of about 100 to 1. They were then dyed with 3% OWF dye at 200–210° F. for one hour in a dye bath acidified with 9% OWF of either acetic acid or formic acid and containing a small amount of nonionic detergent using a bath to fiber ratio of 100 to 1. The dyes employed were Acid Blue 62 (Dye (a)), Acid Red 212 (Dye (b)), and Acid Orange 60 (Dye(c)), all at the 3% OWF level. After dyeing, the skeins were post-scoured for 10 minutes at 160° F. in a bath containing a small amount of nonionic detergent, at a bath to fiber ratio of about 100 to 1.

The color intensities obtained with these dyeings are listed in Table I. In addition to visual ratings, some intensities were measured instrumentally, using the reflectance technique described above.

TABLE I

| Molecular weight of polyethylene glycol | Color intensity [1] | | | | | |
|---|---|---|---|---|---|---|
| | Dye (a) | | Dye (b) | | Dye (c) | |
| | Visual | "I" value | Visual | "I" value | Visual | "I" value |
| No glycol | VL | 26.6 | VL | 25.9 | VL | 27.0 |
| 69 [2] | VL | | VL | | VL | |
| 108 [3] | VL | | VL | | VL | |
| 152 [4] | L | 37.3 | VL | 29.5 | L | 33.5 |
| 194 [5] | M | 99.7 | M | 68.5 | M | 48.4 |
| 300 | D | 139.3 | D | 118.8 | M | 63.2 |
| 400 | VD | | D | | D-VD | |
| 600 | VD | 144.5 | VD | 131.9 | VD | 75.0 |
| 1,000 | MD | | MD | | M-MD | |
| 1,540 | MD | 111.6 | MD | 100.7 | M | 70.9 |
| 4,000 | LM | 84.5 | M | 69.8 | M | 50.9 |
| 17,000 | MD | 95.8 | M | 76.4 | M | 56.9 |
| 150,000 | MD | | M | | MD | |
| 230,000 | MD-D | | M | | MD-D | |
| 450,000 | MD-D | 126.6 | M | 92.4 | MD-D | 71.2 |
| 660,600 | MD-D | | M | | D | |
| 4,000,000 | D | | M | | D | |
| 7,000,000 | D | | M | | D | |

[1] Visual color intensity measured according to the following scale: L=Light; M=Medium; D=Dark; V=Very.
[2] Ethylene glycol.
[3] Diethylene glycol.
[4] Triethylene glycol.
[5] Tetarethylene glycol.

EXAMPLE 3

Blends of 3 parts of the 1:1 copolymer of 2-vinylpyridine and 2-methyl-5-vinylpyridine (intrinsic viscosity 0.9, measured in pyridine at 30° C.), prepared by suspension polymerization using azo-bis-isobutyronitrile as initiator, with 2 parts of polyethylene glycols of molecular weights 450,000, 4 million and 7 million were milled with 100 parts of isotactic polypropylene at 340° F. They were then melt-extruded into fiber by the same procedure as in Example 1. The resultant yarns had tenacities from 2.6 to 4.1 g./den. and breaking elongations from 20 to 80%.

Skeins of these yarns were pre-scoured, dyed with 3% OWF Acid Orange 60, and post-scoured, all by the same procedure as in Example 2. The color intensities of the dyed samples are listed in Table II. A sample of yarn spun from a blend containing no polyethylene glycol was almost colorless, when dyed under the same conditions.

TABLE II

| Sample No. | Polyethylene glycol molecular weight | Amount (phr.) | Color intensity | |
|---|---|---|---|---|
| | | | Visual [1] | "I" value |
| 1 | 7,000,000 | 2 | Very dark | |
| 2 | 4,000,000 | 2 | Very dark | 89.3 |
| 3 | 450,000 | 2 | Very dark | |
| 4 | | None | Almost Colorless | 33.9 |

[1] Visual color intensity measured according to the following scale: L=Light; M=Medium; D=Dark; V=Very.

EXAMPLE 4

Various amounts of different types of polyamides were blended with various amounts of polyethylene glycol of different molecular weights, and the mixtures were blended with 100 parts of isotactic polypropylene in an extruder at 500° F. The resultant blends were chopped into pellets and dried. The pellets were then melt extruded into fiber, drawn and dyed with 3% OWF Acid Orange 60 (Dye (a)), Acid Blue 168 (Dye (b)) and Acid Blue 80 (Dye (c)) using the procedure described in Example 1. The color intensity results of these dyeings are listed in Table III.

TABLE III

| Polyamide | | Polyethylene glycol | | Color intensity [1] | | |
|---|---|---|---|---|---|---|
| Type | Phr. | Molecular weight | Phr. | Dye (a) | Dye (b) | Dye (c) |
| Nylon 6 | 2 | 4,000,000 | 4 | M | M | |
| Nylon 66 | 2 | 4,000,000 | 4 | M | M | |
| Zytel 63 [2] | 2 | 4,000,000 | 4 | D | VD | M |
| Nylon 66 | 4 | 4,000,000 | 4 | D | | |
| Zytel 63 | 4 | 4,000,000 | 4 | VD | | D |
| Zytel 63 | 4 | 660,000 | 4 | D | | |
| Zytel 63 | 4 | 450,000 | 4 | VD | | |

[1] D=Dark; M=Medium; L=Light; V=Very.
[2] An interpolymer of hexamethylene adipamide, hexamethylene sebacamide and caprolactam, sold by E. I. duPont de Nemours and Co.

EXAMPLE 5

A blend of 5 parts of the 1:1 copolymer of 2-vinylpyridine and 2-methyl-5-vinylpyridine with 5 parts of polyethylene glycol of molecular weight 660,000 was milled with 100 parts of isotactic polypropylene at 340° F. Samples of this blend were then pressed into film of about 4 mil thickness in a hydraulic press at 340° F. The film could be dyed with 3% OWF Acid Orange 60 and Acid Blue 45 to deep shades. A similar sample, not containing polyethylene glycol, was colored only a very pale shade when similarly dyed. The preferred blend using the components listed in this example contains from 1 to 4 parts of the vinylpyridine copolymer with from 1 to 5 parts of polyethylene glycol in 100 parts of polypropylene.

EXAMPLE 6

Three (3) parts of poly(2-vinylpyridine), 3 parts of polyethylene glycol of 660,000 molecular weight and 100 parts of linear polyethylene were blended in a compounding extruder. The extrudate was chopped into pellets, dried and then melt-spun into 8-filament yarn. A sample of this yarn dyed to a deep orange-red color with Acid Orange 60. A similar sample, not containing polyethylene glycol, was almost colorless when similarly dyed.

EXAMPLE 7

Three fibers were melt-extruded and drawn using the procedure disclosed in Example 4. The first fiber was poly-4-methyl-pentene-1, the second was poly-4-methyl-pentene-1 and 3 phr. of poly-2-vinylpyridine, and the third was poly-4-methyl-pentene-1, 3 phr. of poly-2-vinyl-pyridene, and 4 phr. of polyethylene glycol (molecular weight 4 million).

Skeins of these yarns were pre-scoured, dyed with 3% OWF Acid Orange 60, and post-scoured all by the same procedure as in Example 2. The color intensities of the dyed samples are listed in Table IV.

TABLE IV

| Sample No. | Composition | Visual color Intensity [1] |
|---|---|---|
| 1 | PMP [1] | Colorless. |
| 2 | PMP [2] plus 3 phr. poly-2-vinylpyridine | VL. |
| 3 | PMP [2] plus 3 phr. poly-2-vinylpyridine plus 4 phr. PEG. | VD. |

[1] L=Light; M=Medium; D=Dark; V=Very.
[2] PMP=Poly-4-methylpentene-1.

EXAMPLE 8

One part of poly(co-styrene-dimethylaminopropylmaleimide), 4 parts of polyethylene glycol of molecular weight 4,000,000 and 100 parts of isotactic polypropylene were blended in an extruder at 550° F., chopped into pellets and dried. The pellets were then melt-extruded into fiber and drawn, all by the same procedure as in Example 1. The nitrogen content of this fiber measured by the Kjeldahl method was 0.098%, half of which, 0.049%, was in the highly basic tertiary amine portion of the molecule.

A skein of this yarn was dyed, as in Example 2, with 3% OWF Acid Orange 60. It almost completely exhausted this dye bath. Its color intensity was very dark and its "I" value correspondingly was 121.9. A similar fiber, made without polyethylene glycol and dyed similarly, exhausted very little dye from the dye bath. Its color was pale and its "I" value was 27.0.

EXAMPLE 9

Polypropylene fibers containing various amounts of poly(co-styrene-dimethylaminopropylmaleimide) and polyethylene glycol (molecular weight 4 million) were melt extruded and drawn by the procedure described in Example 6.

Skeins of these yarns were pre-scoured, dyed with 3% OWF Acid Orange 60, and post-scoured, all by the same procedure as in Example 2. The preferred blend using the components listed in this example contains from 0.5 to 3 parts of poly(co-styrene-dimethylaminopropylmaleimide) with from 3-5 parts of polyethylene glycol in 100 parts of polypropylene. The color intensities of the dyed samples are listed in Table V.

TABLE V

| Sample No. | Phr. of copolymer | Phr. of polyethylene glycol | Color intensity Visual [1] | "I" value |
|---|---|---|---|---|
| 1 | 2 | 0 | VL | 39.8 |
| 2 | ½ | 4 | VD | 115.5 |
| 3 | ½ | 5 | VD | 126.2 |
| 4 | 1 | 3 | VD | 120.4 |
| 5 | 1 | 4 | VD | 126.2 |
| 6 | 2 | 3 | VD | 133.6 |
| 7 | 2 | 4 | VD | 133.6 |
| 8 | 3 | 4 | VD | 135.8 |

[1] L=Light; M=Medium; D=Dark; V=Very.

EXAMPLE 10

Blends of 3 parts of poly-2-vinylpyridine with 2 or 4 parts of either polyethylene glycol, polypropylene glycol (branched and unbranched), polytetramethylene glycol (PTMG), or polyoxymethylene were milled with 100 parts of isotactic polypropylene at 340° F. They were melt-extruded into fiber and drawn by the same procedure as in Example 1.

Skeins of these yarns were pre-scoured, dyed with 1% and 3% OWF Acid Orange 60, and post-scoured, all by the same procedure as in Example 2. The color intensities of the dyed samples are listed in Table VI.

TABLE VI

| Polyolefin glycol | | | Visual [1] 3% OWF | Color intensity, "I" value, 3% OWF |
|---|---|---|---|---|
| Type | Phr. | Mol. wt. | | |
| Propylene glycol | 2 | 76 | VL | |
| Dipropylene glycol | 2 | 133 | VL | 29.8 |
| Polypropylene glycol | 2 | 425 | VL | 29.8 |
| Do | 2 | 1,025 | VL | 35.2 |
| Polypropylene glycol [2] | 2 | 400 | VL | |
| Do | 2 | 700 | L | |
| Do | 2 | 1,500 | VL | |
| Do | 2 | 4,000 | NC | |
| PTMG | 2 | 2,300 | VL | |
| Polyoxymethylene | 2 | | NC | |
| Polyethylene glycol | 2 | 400 | VD | 80.0 |
| Do | 2 | 1,540 | D | |
| Polypropylene glycol | 4 | 425 | NC | |
| PTMG | 4 | 2,300 | NC | |
| None | None | None | NC | 33.6 |

[1] Visual ratings: L=Light; M=Medium; D=Dark; V=Very; NC=No Color.
[2] Polypropylene glycol formed by reacting propylene oxide with the three reactive —OH groups in glycerine.

On the basis of the color intensities shown in Table VI it is readily apparent that polypropylene glycol does not provide the dyeability obtained when polyethylene glycol is used in accordance with the present invention.

EXAMPLE 11

Blends of 3 parts of poly-2-vinylpyridine with 2 parts of various low molecular weight (ea. 200 or less) compounds, whose solubilities, stabilities, and boiling points make them potential hydrophiles, were milled with 100 parts of isotactic polypropylene at 340° F. The blend was then melt-mixed into fiber and drawn using the procedure disclosed in Example 1.

Skeins of these yarns were pre-scoured, dyed with 1% or 3% OWF Acid Orange 60, and post-scoured, using the procedures of Example 2. The color intensities of the dyed samples are listed in Table VII.

TABLE VII

| Compound used | Color intensity [1] | |
|---|---|---|
| | 1% OWF | 3% OWF |
| Decenylsuccinic anhydride | VL | VL |
| Dodecylbenzene sulfonic acid | VL | VL |
| 1,6-hexanediol | VL | VL |
| 2-methyl-2,4-pentanediol | VL | VL |
| 1,4-butanediol | VL | VL |
| n-Hexyl Cellosolve | VL | VL |
| Butly Carbitol | VL | VL |
| 1-butoxy-2-ethoxy propanol | VL | VL |
| Methoxy-triglycol | VL | VL |
| Ethoxy triglycol | VL | VL |
| Diethylene glycol diethyl ether | VL | VL |
| Butyl Carbitol acetate | VL | VL |
| Glyceryl triacetate | VL | VL |
| Thiodiglycol | VL | VL |

[1] VL=Very light.

EXAMPLE 12

Blends of 3 parts of poly-2-vinylpyridine with 2 parts of ethylene oxide-propylene oxide block copolymers of varying composition and molecular weight were milled with 100 parts of isotactic polypropylene at 340° F. The blends were then melt-extruded into fiber and drawn using the procedure disclosed in Example 1.

Skeins of these yarns were pre-scoured, dyed with 3% OWF Acid Orange 60, and post-scoured, using the procedure of Example 2. The color intensities of the dyed samples are listed in Table VIII. As noted in the table a satisfactory level of dyeability is obtained only when the percent ethylene oxide in the copolymer is above the required amount.

TABLE VIII

| Percent ethylene oxide in block copolymer | Block copolymer molecular weight | Color intensity [1] |
|---|---|---|
| 10 | 1,055 | VL |
| 10 | 2,500 | VL |
| 10 | 4,445 | NC |
| 30 | 2,500 | VL |
| 30 | 4,645 | VL |
| 50 | 1,900 | L |
| 50 | 3,500 | L |
| 50 | 4,500 | VL |
| 50 | 6,500 | VL |
| 70 | 13,335 | M-D |
| 80 | 4,750 | M |
| 80 | 8,750 | M |
| 80 | 11,250 | M |
| 80 | 16,250 | D |

[1] V=Very; L=Light; M=Medium; D=Dark.

EXAMPLE 13

Blends of 3 parts of poly-2-vinylpyridine with 2 parts of ethylene oxide-propyloxide irregularly alternating copolymers of varying composition and molecular weight were milled with 100 parts of isotactic polypropylene at 340° F. The blend was then melt-extruded into fiber and drawn by the same procedure as in Example 1.

Skeins of these yarns were pre-scoured, dyed with 3% OWF Acid Orange 60, and post-scoured, all by the same procedure as in Example 2. The color intensities of the dyed samples are listed in Table IX.

TABLE IX

| Percent ethylene oxide in copolymer | Copolymer mol. wt. | Color intensity |
|---|---|---|
| 50 | 950 | VL |
| 50 | 1,010 | VL |
| 50 | 1,700 | VL |
| 50 | 2,750 | VL |
| 50 | 4,200 | VL |
| 75 | 2,600 | M-D |
| 75 | 13,200 | M |
| 75 | 21,600 | M-D |

[1] Code, L=Light; M=Medium; D=Dark; V=Very.

The table discloses that the satisfactory level of dyeability is obtained only when the percent ethylene oxide in the copolymer is above the required level.

EXAMPLE 14

Blends of 3 parts of poly-2-vinylpyridine with 2 parts of polyethylene glycol monomethyl ethers of various molecular weights were milled with 100 parts of isotactic polypropylene at 340° F. The blend was then melt-extruded into fiber and drawn using the procedure of Example 1.

Skeins of these yarns were pre-scoured, separately dyed with 3% OWF Acid Orange 60 and Acid Red 212, and post-scoured, using the procedure detailed in Example 2. The color intensities of the dyed samples are lised in Table X.

TABLE X

| Polyethylene glycol monomethyl ether molecular weight | Color intensity [1] | | |
|---|---|---|---|
| | Acid -range 60 | | Acid Red 212, visual |
| | Visual | "I" value | |
| 122 | NC | 29.6 | |
| 350 | M | 54.4 | D |
| 550 | D | 64.8 | D |
| 750 | D | 67.8 | D |
| 2,000 | M | 56.1 | M |
| 5,000 | M | 55.5 | M |

[1] L=Light; M Medium; D=Dark; V=Very; NC=No color.

EXAMPLE 15

Blends of 3 parts of poly (2-vinylpyridine) with 2 parts of polyethylene glycol octylphenyl ethers of varying composition and molecular weight were milled with 100 parts of isotactic polypropylene at 340° F. The blend was melt-extruded into fiber and drawn using the procedure of Example 1.

Skeins of these yarns were pre-scoured, dyed with 3% OWF Acid Orange 60 and post-scoured, using the procedures set forth in Example 2. The color intensities of the dyed samples are listed in Table XI.

TABLE XI

| Type polymeric ether used | No. of ethylene oxide units | Percent ethylene oxide | Color intensity [1] |
|---|---|---|---|
| Octylphenylpolyethoxy ethanol | 1 | 15 | VL |
| Do | 5 | 47 | L |
| Do | 9-10 | 64 | M |
| Do | 30 | 84 | D |

[1] L=Light; M=Medium; D=Dark; V=Very.

This table discloses that the satisfactory level of dyeability is obtained when the percent ethylene oxide is above the required amount.

EXAMPLE 16

Blends of 3 parts of poly-2-vinylpyridine with 2 parts of polyethylene glycol esters of varying composition and molecular weight were milled with 100 parts of isotactic polypropylene at 340° F. The blend was melt-extruded into fiber and drawn using the procedure of Example 1.

Skeins of these yarns were pre-scoured, dyed with 3% OWF Acid Orange 60, and post-scoured, using the procedures set forth in Example 2. The color intensities of the dyed samples are listed in Table XII.

TABLE XII

| Polyethylene glycol ester | | | |
|---|---|---|---|
| Type used | Percent ethylene oxide | Mol. wt. | Color intensity |
| PEG distearate | 10 | 630 | Almost colorless |
| Do | 41 | 970 | Very light. |
| PEG sorbitan monostearate | 66 | 1,344 | Dark. |
| PEG sorbitan monolaurate | 71 | 1,247 | Do. |
| PEG monostearate | 94 | 4,170 | Medium. |

EXAMPLE 17

In order to illustrate that a fiber containing a copolymer of vinylpyridine and styrene blended with the polyolefin and ethylene glycol compound does not provide the enhanced dyeability which is obtained when polyvinylpyridine is blended with these other polymers, various blends containing different amounts of either poly-2-vinylpyridine or a copolymer of 70% poly(2-vinylpyridine)-30% styrene and various amounts of polyethylene glycols of different molecular weights were milled with 100 parts of isotactic polypropylene, melt-extruded into fibers drawn, and dyed with 3% OWF Acid Orange 60 (Dye (c)) Acid Blue 78 (Dye (d)) and Acid Red 212 Dye (b)) using the procedure of Example 1. The color intensities obtained with these dyeings are listed in Table XIII.

TABLE XIII

| Dye receptor | | Polyethylene glycol | | Color intensity [1] | | | | |
|---|---|---|---|---|---|---|---|---|
| | | | | Dye (c) | | Dye (d) | | Dye (b) |
| Type | Phr. | Molecular weight | Phr. | Visual | "I" value | Visual | Percent dye fiber [2] | Visual |
| Poly(2-vinylpyridine) | 3 | [3] | | VL | | VL | | VL |
| Copolymer 70% 2-vinylpyridine, 30% styrene | 3 | [3] | | VL | | VL | | VL |
| Poly(2-vinylpyridine) | 3 | 660,000 | 2 | D | 73.0 | VD | | M |
| Copolymer 70% 2-vinylpyridine, 30% styrene | 4.3 | 6,000 | 2 | L | 44.1 | | | |
| Poly(2-vinylpyridine) | 3 | 450,000 | 2 | D | | VD | 1.620 | |
| Copolymer 70% 2-vinylpyridine, 30% styrene | 4.3 | 660,000 | 2 | VL | 38.6 | L | 0.395 | VL |
| Poly(2-vinylpyridine) | 2 | 4,000,000 | 4 | VD | | VD | | |
| Copolymer 70% 2-vinylpyridine, 30% styrene | 3 | 660,000 | 4 | VL | | L | | |
| Do | 5 | 6,000 | 5 | VL | | VL | | VL |
| Do | 5 | 4,000,000 | 5 | LM | | VL | | VL |

[1] L=Light; M=Medium; D=Dark; V=Very.
[2] The dye content was determined colorimetrically by dissolving the dyed fibers in a 70/30 mixture of Decalin and isopentyl alcohol (by volume).
[3] No PEG.

EXAMPLE 18

To show that certain polymers which are unstable at fiber processing conditions and too water soluble cannot be utilized as the nitrogen containing polymer in the present invention, various polyethylene imines, polyethylene glycols and 100 parts of isotactic polypropylene were blended in an extruder at 500° F., chopped into pellets and dried. The pellets were then melt-extruded into fiber. Extrusion of the blend into fiber was difficult and in some cases the extrudate broke before it could be wound onto a take-up spool. In all of the other cases where a fiber was obtained it was coarse, and due to poor dispersion had lumps in it, and had a yellowish-brown color. Due to their poor quality, none of the fibers could be drawn to yield useable yarns.

French Pat. 1,321,694 discloses materials containing a polyolefin and a polyethyleneimine but the articles are formed therefrom by compression molding and no mention is made of these compositions being melt-extruded into fibers.

The polyethylene imine-polyethylene glycol combinations are listed in Table XIV.

TABLE XIV

| Polyethylene imine | | Polyethylene glycol,[1] phr. | Fiber quality |
|---|---|---|---|
| Type | Phr. | | |
| Montrek 12 [2] | 1 | 4 | Poor. |
| Montrek 600 | 1 | 4 | Do. |
| Montrek 100 | 1 | 4 | Do. |
| Montrek 600E | 1 | 4 | Do. |
| Montrek 1000 | 0.75 | 4 | Do. |
| Montrek 1000 | 1.5 | 4 | Do. |

[1] The molecular weight of the polyethylene glycol is 4,000,000.
[2] Montrek polyethyleneimine resins are sold by The Dow Chemical Company. Montrek 12 has a molecular weight of 1,200; Montrek 600=40,000–60,000; Montrek 1,000=50,000–100,000 and Montrek 600E is hydroxyethylated polyethylene made by the complete reaction of Montrek 600 and ethylene oxide.

EXAMPLE 19

Blends of various amounts of either tri(dodecylamine) or poly(2-vinylpyridine) with polyethylene glycols of different molecular weights were milled with 100 patrs of isotactic polypropylene, melt extruded into fibers, drawn and dyed with 3% OWF Acid Orange 60 by the same procedure as in Example 1. The color intensities obtained with these dyeings are listed in Table XV. Although the fiber containing tri(dodecylamine) appeared to absorb some dye initially, the dye particles were only on the fiber surface in the form of dye agglomerates and after a cold water rinse, the fibers became colorless. These dye agglomerates are formed by the combination of the low molecular weight dye receptor leached out of the fiber in the dyebath, with dissolved dyestuff. They precipitate in the dyebath and deposit on the surface of the fiber.

TABLE XV

| Dye receptor | Phr. | Polyethylene glycol, phr. | Color intensity [1] |
|---|---|---|---|
| Tri(dodecylamine) | 3 | 2 | VL |
| Do | 2 | 4 | L |
| Do | 3 | 4 | L |
| Poly(2-vinylpyridine) | 1 | 3 | D |
| Do | 2 | 4 | VD |
| Do | 3 | 4 | VD |

[1] L=Light; M=Medium; D=Dark; V=Very.

EXAMPLE 20

Blends of various amounts of poly-2-vinylpyridine with various amounts of polyethylene glycols of different molecular weights were milled with 100 parts of isotactic polypropylene, melt-extruded into fiber, and dyed with 3% OWF Acid Orange 60 by the same procedures as in Example 1. The preferred blend using the components listed in this example contains from 1 to 4 parts poly-2-vinylpyridine with from 1–5 parts of polyethylene glycol in 100 parts of polypropylene. The color intensities obtained with these dyeings are listed in Table XVI.

TABLE XVI

| Poly (2-vinylpyridine) phr. | Polyethylene glycol | | Color intensity (1) | |
|---|---|---|---|---|
| | Molecular weight | Phr. | Visual | "I" value |
| 3 | [2] | | VL | 32.7 |
| 1 | 4,000,000 | 4 | VD | 123.7 |
| 1 | 450,000 | 4 | D | 88.1 |
| 1 | 17,000 | 4 | M | 65.6 |
| 1 | 6,000 | 4 | LM | 41.5 |
| 1 | 400 | 4 | M | 63.9 |
| 1 | 4,000,000 | 2 | M | |
| 1 | 4,000,000 | 3 | D | |
| 1 | 4,000,000 | 5 | VD | |
| 1.5 | 4,000,000 | 4 | VD | |
| 2 | 4,000,000 | 4 | VD | |
| 3 | 4,000,000 | 2 | D | |
| 3 | 4,000,000 | 4 | VD | |
| 4 | 4,000,000 | 4 | VD | |
| 1 | 600 | 1 | VL | 38.7 |
| 1 | 600 | 2 | LM | |
| 1 | 600 | 4 | LM | 48.8 |
| 2 | 600 | 1 | LM | |
| 2 | 600 | 2 | M | 73.4 |
| 2 | 600 | 3 | M | 74.8 |
| 2 | 600 | 4 | M | 69.0 |
| 3 | 600 | 2 | VD | 89.0 |
| 3 | 600 | 3 | D | 84.8 |

[1] L=Light; M=Medium; D=Dark; V=Very.
[2] No PEG.

EXAMPLE 21

To illustrate the fastness properties of the dyed yarns made according to the present invention, dyeings made on yarns containing representative combinations of polyethylene glycol and dye receptors were submitted to standard fastness tests of The American Association of Textile Chemists and Colorists. Wash fastness, dry-cleaning fastness and light fastness were measured on dyeings with an acid dye (Acid Orange 60) and with a disperse dye (Disperse Orange 26). The results are summarized in Table XVII.

TABLE XVII

| Dye receptor | Fiber composition Polyethylene glycol molecular wt. | 1% OWF Acid Orange 60, wash fastness AATCC #2 (Color loss) | 1% OWF Dipserse Orange 26, dry cleaning AATCC (Color loss) | Lightfastness, color loss after 40 standard fading hours | |
|---|---|---|---|---|---|
| | | | | 1% OWF Acid Orange 60 | 1% OWF Disperse Orange 26 |
| Poly(2-vinylpyridine) [1] | [2] 4,000,000 | Slight | Very slight | Very slight | Very slight. |
| Do | [1] 4,000,000 | Very slight | Very slight | Slight | Very slight. |
| Do | [2] 600,000 | Slight | Very slight | Not run | Not run. |
| Do | [1] 600,000 | Very slight | Very slight | Not run | Very slight. |

[1] 3 parts by weight per 100 parts of resin.
[2] 1 part by weight per 100 parts of resin.

During the manufacturing processes used to produce a fiber or article which is capable of being formed into a fiber within the scope of the present invention, there may be a breakdown in the molecular weight of the starting (C) component in the blend. This breakdown is more severe at the higher initial molecular weights listed. The breakdown of this component is dependent upon a number of variable factors such as temperature of extrusion, shear, stabilizer system, dwell time in the extruder, heat history of the material, etc. This breakdown does not adversely affect the dyeability of the fiber or article. The critical requirement of the present invention is that the (C) component possess a molecular weight of at least 194 (DP of 4) and an ethylene oxide content of not less than 60%. Polyethylene glycol having a molecular weight of less than 2,000 shows little or no breakdown so that, at molecular weights below 2,000, the (C) component in the fiber is essentially the same as the starting material.

To illustrate this breakdown of the (C) component, 100 parts of isotactic polypropylene, 3 parts of poly-2-vinylpyridine and 2 parts of polyethylene glycol having the molecular weights indicated in Table XVIII were formed into fibers using the general procedure detailed in Example I with the exception that various conditions such as temperature, dwell time, etc., were varied when forming the fiber. The polyethylene glycol, contained in each of the fibers produced using the various methods, was isolated and the molecular weights were calculated from the intrinsic viscosity in benzene at 30° C. For each starting molecular weight above about 2,000, a range of final molecular weights in the fiber was found, depending on the particular condition used in producing the fiber. The following table is presented to illustrate (and not by way of limitation) that there is some degree of breakdown (degradation) of polyethylene glycol at higher molecular weights and very little breakdown at the lower molecular weights during the processing which is a requisite part of this invention.

Table XVIII.—Molecular weight of polyethylene glycol

| Start | Found in the fibers |
|---|---|
| 4,000,000 | 160,000–40,000 |
| 400,000 | 25,700–8,300 |
| 18,600 | 7,000–3,500 |
| 4,000 | 1,500–1,300 |
| 1,300 | 1,250 |

The particular molecular weight polyethylene glycols used in the examples were obtained from the following sources:

Molecular weight, 7,000,000, Union Carbide Polyox Coagulant.
Molecular weight, 4,000,000, Union Carbide Polyox WSR 301.
Molecular weight, 600,000, Union Carbide Polyox WSR 205.
Molecular weight, 200,000, Union Carbide Polyox WSR 35.
Molecular weight, 20,000, Union Carbide Carbowax 20M.
Molecular weight, 6,000, Union Carbide Carbowax 6000.
Molecular weight, 400, Olin-Mathieson Poly-G 400.

This application is a continuation-in-part of my earlier application Ser. No. 599,362 filed Dec. 6, 1966, now abandoned.

What I claim and desire to protect by Letters Patent is:
1. A fiber-forming composition of matter which is dyeable with anionic dyes without pretreatment comprising:
 (A) less than 97% of an alpha-mono-olefin hydrocarbon polymer,
 (B) between about 0.5 and 5% of a basic nitrogen-containing polymer selected from the group consisting of
  (a) thermoplastic homopolymers of vinyl-substituted monocyclic and polycyclic pyridine compounds;
  (b) thermoplastic copolymers of vinyl substituted monocyclic and polycyclic pyridine compounds with each other;
  (c) thermoplastic intralinear condensation polyamides;
  (d) thermoplastic, thermostable extra- and intralinear polymeric alkyl or aryl non-pyridine-containing amines;
 (C) and between about 0.5% and 5% of an ethylene oxide-containing polymer having a molecular weight in the ranges of from 300 to 1500 and 100,000 to 7,000,000 and selected from the group consisting of:
  (a) homopolymers of ethylene oxide;
  (b) ether and ester derivatives thereof;
  (c) copolymers of ethylene oxide and an alkylene oxide other than ethylene oxide, all of which ethylene oxide containing polymers possess a degree of polymerization not less than 4, and an ethylene oxide content not less than 60%, and wherein the total amount of said (B) plus (C) component is greater than 3%.

2. A melt extruded fiber, or film which is capable of being formed into a fiber having the composition defined in claim 1.

3. The composition defined in claim 1, wherein the alpha-mono-olefin hydrocarbon polymer is selected from the group consisting of polypropylene, polyethylene, and poly(4-methyl-1-pentene).

4. The composition defined in claim 1, wherein said thermoplastic pyridine homopolymers are selected from the group consisting of poly(vinylpyridines), poly(alkyl-substituted vinylpyridines), poly(vinylquinolines) or poly (alkyl substituted vinylquinolines).

5. The composition defined in claim 1, wherein said thermoplastic pyridine copolymers are selected from the group consisting of copolymers made from comonomers of 2-vinylpyridine and an alkylvinylpyridine, 4-vinylpyridine and an alkylvinylpyridine, 4-vinylpyridine and vinylquinoline, 4-vinylpyridine and 2-vinylpyridine, and alkylvinylpyridines with each other.

6. The composition defined in claim 1, wherein said thermoplastic intralinear condensation polyamide is selected from the group consisting of nylon 6, nylon 66, nylon 610, and copolyamides of hexamethylene adipamide and hexamethylene sebacamide with caprolactam.

7. The composition defined in claim 1, wherein said thermoplastic polymeric amine compounds are selected from the group consisting of the copolymer of styrene with 3-N-(dialkylamino) propylmaleimide and the polymeric reaction product of N-methyl-bis-amino propylamine with 2,4-tolylene diisocyanate.

8. The composition defined in claim 1, wherein the derivatives of polyethylene glycol are selected from the group consisting of (a) polyethylene glycol alkyl ethers, (b) alkylaryl polyethoxy alcohols, (c) polyethylene glycol hexitol carboxylates, and (d) polyethylene glycol carboxylates.

9. The composition defined in claim 1, one of the co-monomers in said copolymers of ethylene oxide is propylene oxide.

10. The composition defined in claim 1 wherein the homopolymer of ethylene oxide has a molecular weight in the range between about 100,000 to 7,000,000.

11. The composition defined in claim 1, wherein said nitrogen-containing polymer is poly-2-vinylpyridine.

12. The composition defined in claim 1, wherein said nitrogen containing polymer is a copolymer of 2-vinylpyridine and 2-methyl-5-vinylpyridine.

13. The fiber defined in claim 2, which contains between about 0.025% and 1.5% (weight percent) of basic nitrogen therein.

14. The fiber defined in claim 2 wherein said alpha monoolefin polymer is polypropylene and the (C) component is polyethylene glycol having a molecular weight between 194 and 7,000,000.

15. The fiber defined in claim 14 which contains between about 1 and 4 parts of poly-2-vinylpyridine and between about 1 and 5 parts of polyethylene glycol.

16. The fiber defined in claim 14 which contains between 1 and 4 parts of said vinylpyridine copolymer and between about 1 and 5 parts of polyethylene glycol.

17. The fiber defined in claim 14 which contains between 0.5 and 3 parts of nitrogen-containing copolymer and between about 3 and 5 parts of polyethylene glycol.

References Cited

UNITED STATES PATENTS

| | | | |
|---|---|---|---|
| 3,025,257 | 3/1962 | Coler | 260—94.9 |
| 3,107,228 | 10/1963 | Cappuccio | 260—857 |
| 3,329,557 | 7/1967 | Magat | 161—172 |
| 3,361,843 | 1/1968 | Miller | 260—857 |
| 3,371,130 | 2/1968 | Seifert | 260—897 |
| 3,337,652 | 8/1967 | Press | 260—895 |
| 3,375,213 | 3/1968 | Press | 260—895 |

FOREIGN PATENTS

| | | |
|---|---|---|
| 731,728 | 6/1955 | Great Britain. |
| 963,320 | 7/1964 | Great Britain. |
| 1,016,562 | 1/1966 | Great Britain. |
| 1,386,272 | 12/1964 | France. |
| 40/9,742 | 5/1965 | Japan. |

PAUL LIEBERMAN, Primary Examiner

U.S. Cl. X.R.

8—55Bu—4; 260—78, 78.5, 895, 897